US 6,565,069 B2

(12) United States Patent
Morris

(10) Patent No.: US 6,565,069 B2
(45) Date of Patent: May 20, 2003

(54) HANDRAIL GATE, HINGE COUPLING AND LOCK

(76) Inventor: Charles H. Morris, 2821 Rockwell Ave., Victoria BC (CA), V9A 2M8

( * ) Notice: Subject to any disclaimer, the term of this patent is extended or adjusted under 35 U.S.C. 154(b) by 0 days.

(21) Appl. No.: 09/911,753

(22) Filed: Jul. 23, 2001

(65) Prior Publication Data
US 2002/0017062 A1 Feb. 14, 2002

(30) Foreign Application Priority Data
Aug. 2, 2000 (CA) ............................................ 2314839

(51) Int. Cl.⁷ ............................................... E04H 17/16
(52) U.S. Cl. ........................ 256/73; 49/49; 256/65.15; 403/102
(58) Field of Search ..................... 49/394, 49; 292/175; 256/1, 59, 65.01, 65.02, 65.15, 73; 403/102

(56) References Cited

U.S. PATENT DOCUMENTS

| | | | | |
|---|---|---|---|---|
| 2,518,207 A | * | 8/1950 | Wagner ........................ 292/175 |
| 2,999,671 A | | 9/1961 | Blayden | |
| 3,233,871 A | | 2/1966 | Schroer | |
| 3,263,351 A | * | 8/1966 | Olson .......................... 292/175 |
| 3,864,051 A | | 2/1975 | Reid | |
| 4,131,378 A | * | 12/1978 | Daws ............................ 403/93 |
| 4,150,907 A | | 4/1979 | Thurnauer | |
| 4,398,840 A | | 8/1983 | French | |
| 4,768,303 A | * | 9/1988 | Baylink ....................... 43/18.1 |
| 4,787,475 A | * | 11/1988 | Arteau et al. ................. 182/82 |
| 4,952,092 A | | 8/1990 | Ballerstein | |
| 5,457,828 A | * | 10/1995 | Huang ........................... 5/99.1 |
| 5,746,533 A | * | 5/1998 | Schmidt ...................... 403/102 |
| 5,964,545 A | * | 10/1999 | Cheng ......................... 403/102 |

* cited by examiner

Primary Examiner—Jerry Redman
(74) Attorney, Agent, or Firm—Robert H. Barrigar

(57) ABSTRACT

A hinge coupling and a lock for connecting a stationary handrail to a gate arm for a gate. The gate in closed position retains the structural integrity and peripheral profile of the handrail. The hinge coupling consist of a fixed connector and a mobile connector, both pivotally connected to a middle link by pins. The components of the hinge coupling pivot about the pins, enabling the gate arm to pivot through a 180° angle. One hinge connector is inserted and secured into an open end of the stationary handrail. The other connector is inserted and secured into an open end of the gate arm. The lock consists of two mating active and passive components that are fastened to respective terminal ends of the handrail and gate arm. The lock components are provided with a manually releasable latch. All components in the closed position of the gate compactly fit together and are shaped to provide peripheral continuity.

59 Claims, 4 Drawing Sheets

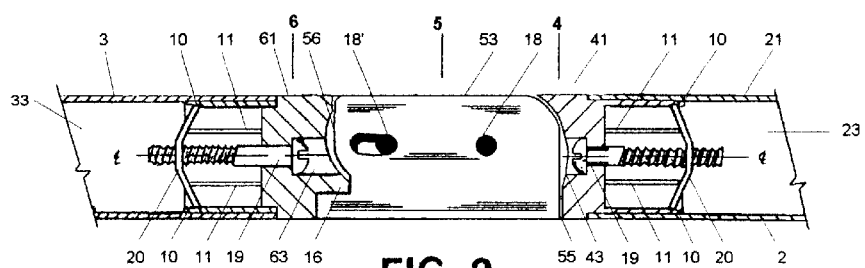
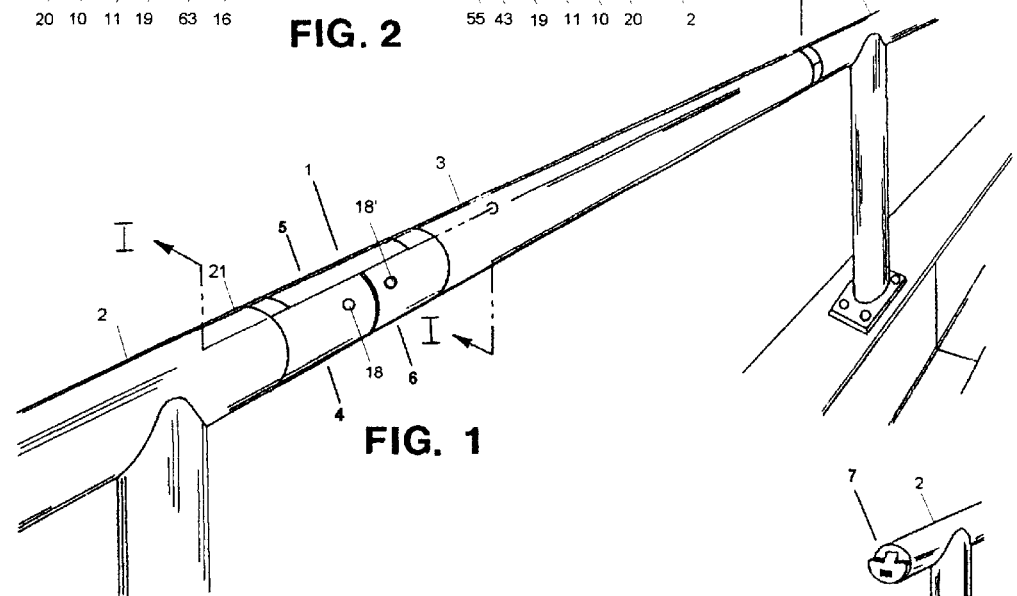
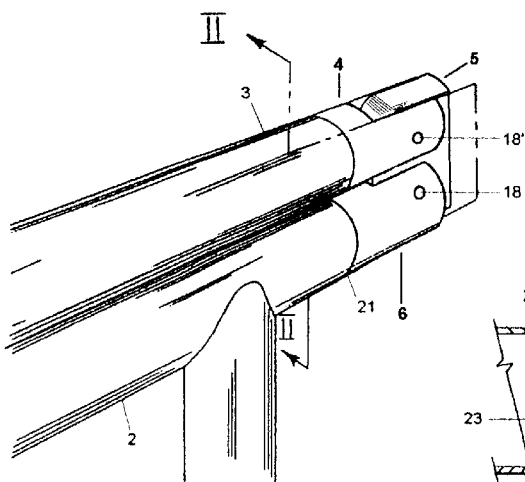
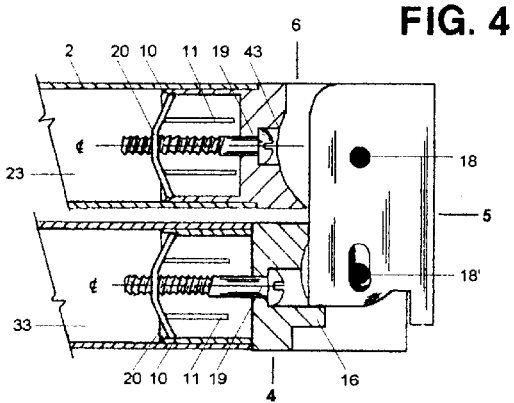

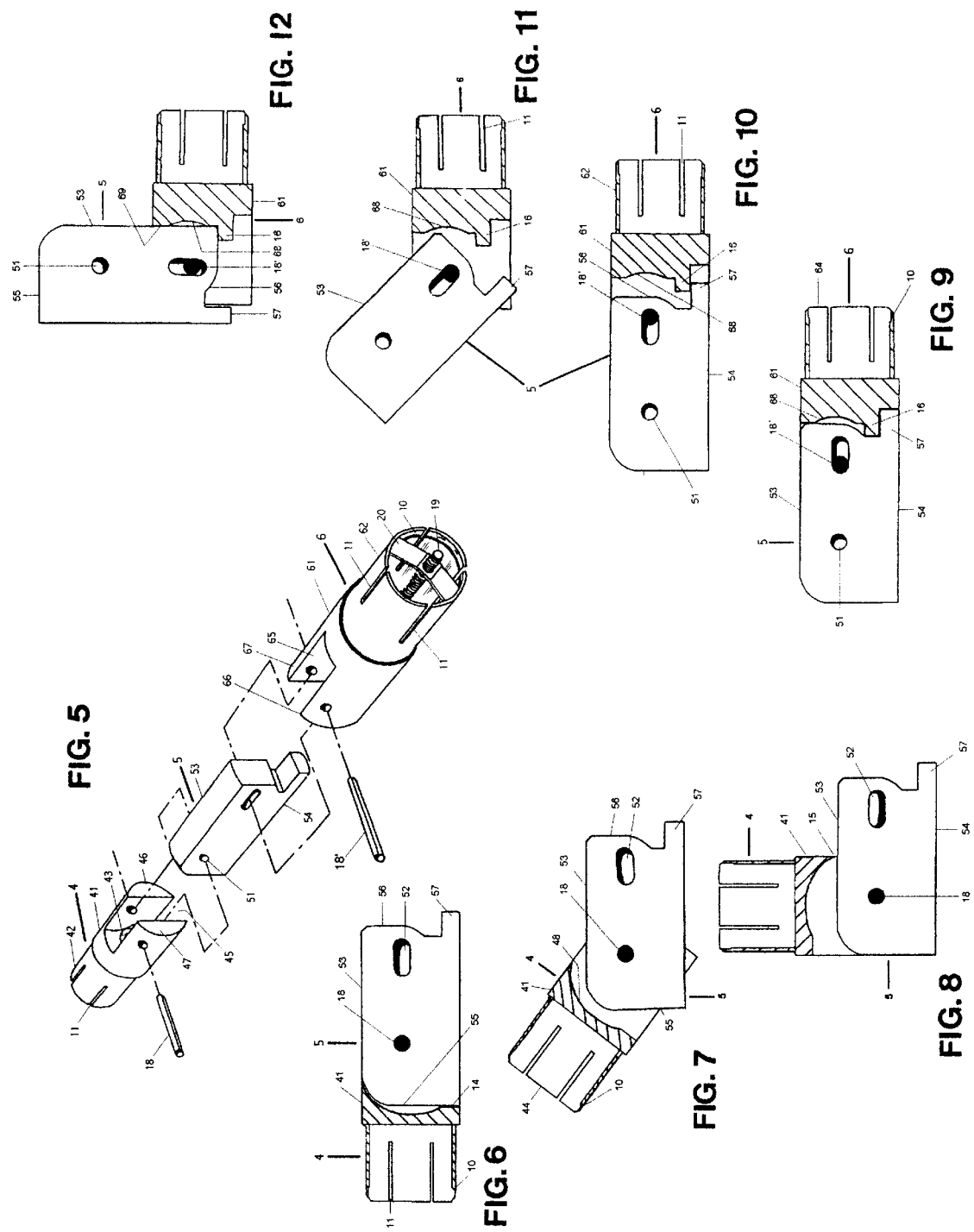

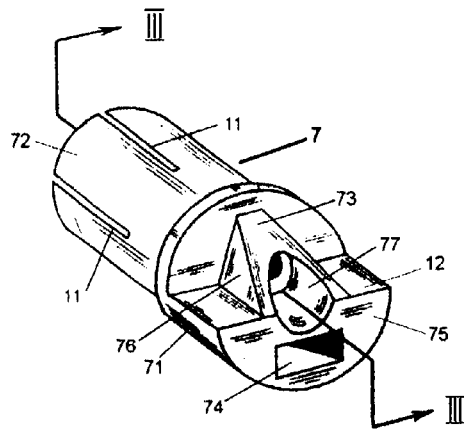
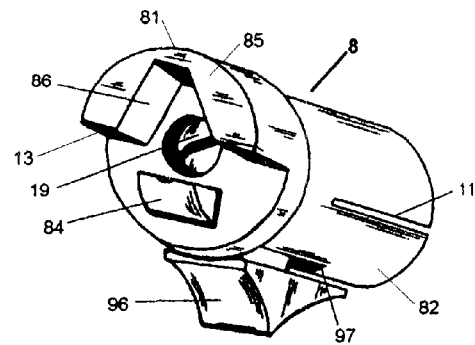
FIG. 13
FIG. 16
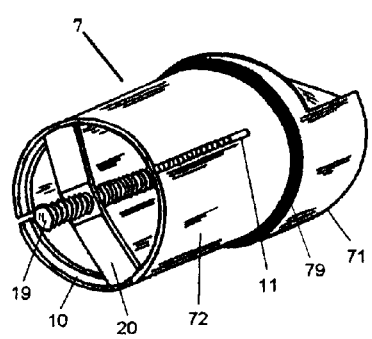
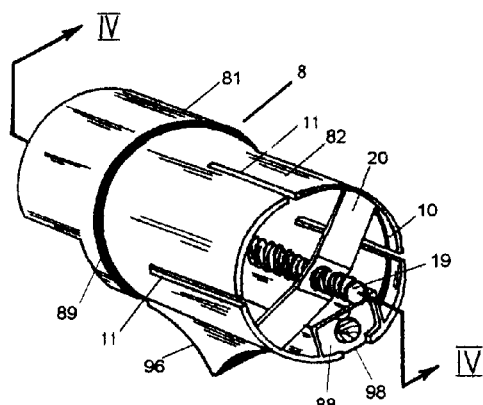
FIG. 14
FIG. 17
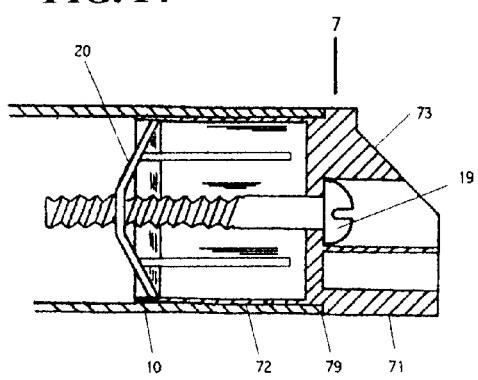
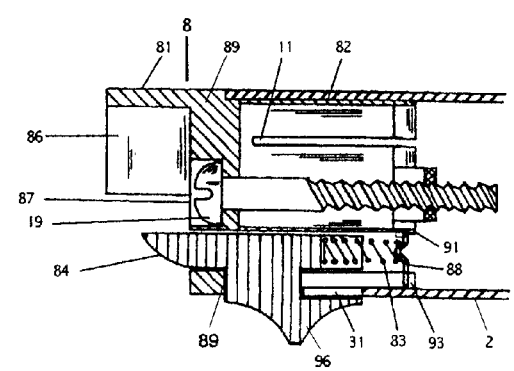
FIG. 15
FIG. 18

HANDRAIL GATE, HINGE COUPLING AND LOCK

FIELD OF THE INVENTION

This invention relates to connections for tubular structures suitable for use as handrails, and more particularly to a hinge coupling and lock that can be attached to a standard handrail to form, together with an arm in the form of a short tubular rail component, a pivotally openable gate that opens and closes the handrail where it is necessary to have a closeable access through the handrail.

BACKGROUND OF THE INVENTION

Usually, handrails consist of horizontally and vertically arranged and connected metal hollow tubes of a selected cross-section, frequently circular. The handrails may be supported on a wall by horizontal mounting posts or may be supported from a floor by posts or stanchions, which are spaced from one another. The stanchions and wall mounting posts are interconnected by lengths of generally horizontal hollow tubing constituting the handrail, but the handrail may also be inclined or vertical along staircases or ladders. Handrails are installed to improve the safety of a specific site and to serve as a support in walking and climbing. In many industrial and civil buildings, handrails are an indispensable installation required by safety regulations.

In some places, it is necessary to make available an opening in the handrail to enable access to an area on the other side of the handrail. In many cases, those openings are simply left free as they do not need to be further secured (for example, when a handrail along a sidewalk is discontinued and restarted again to create an opening for accessing a crosswalk). In other sites, however, such openings reduce the safety of the installation, particularly where a handrail separates two areas situated at different levels. In those cases, it is desirable to secure the opening by creating some barrier or gate so the handrail constantly serves its safety purpose in its full length, but can be opened when needed.

Such gates within handrails can be commonly found in many manufacturing buildings, in the construction industry and in the marine industry, of which the field of recreational yachting is important. When an opening in the handrail is essential for a staircase, construction elevator, permanent ladder, or for boarding a vessel, some previous rather unsatisfactory designs for an openable section of the handrail that would maintain the structural integrity of the handrail have been proposed. It is desirable that any gate when closed, form an essentially uninterrupted continuum with the adjoining portions of the handrail, so that one's hand can pass along the gate and adjoining railing without impediment, and so that little or no risk of catching a glove or a sleeve occurs when gripping the railing in the gate portion or adjoining portions. It is further desirable that the gate be secure when closed. It is further desirable that all connecting parts, such as hinges, clasps and locks, be simple, reliable, easily manufactured, and strong enough for the purpose. Unfortunately, previously known gate arrangements have fallen short of one or more of these objectives.

In the industry, closing of a gate providing a temporarily open section of a handrail is typically achieved by mounting a simple hinge at one side of the gate bar or tube. The hinge connects one end of the stationary handrail with a sectional pivoting arm constituting the gate bar or tube, usually moving in a ninety degree angle. The arm is long enough to reach the other side of the temporary opening in the handrail, where it is usually received by a mating saddle-type receptacle attached to a horizontal part of the adjoining stationary handrail. Because the closed pivoting arm is not secured or locked by any means, but simply rests in the saddle and can be accidentally opened by bumping into it from the bottom, the gate constitutes a potentially hazardous section of the handrail. In addition, the hinge attachment, which represents the only means of permanent connection of the arm, can be easily damaged when a force is applied to the closed pivoting arm from its side.

To prevent accidental opening of such a conventional gate, holes are often drilled through the pivoting arm and through the handrail saddle, and removable bolts or pins are inserted into the holes to ensure that the closed arm does not open by accident nor move when a generally horizontal force is applied to it. However, obtrusive elements, such as exposed bolt heads and pins, reduce the overall safety of the handrail, as they can cause hand injuries when a person suddenly grips the handrail. Accordingly, although the conventional design of the mountable pivoting arm is advantageous to a limited extent, the methods of attachment and locking of the arm to the stationary handrail present potential opportunities for improvement.

For marine use, and typically in the construction of handrails for recreational yachts and the like, openings in the handrails, if secured at all, are commonly secured by mounting a stainless steel chain and hook, or a plastic coated stainless steel wire cable and hook, to stanchions or posts or terminating stationary rail elements at the ends of the opening. Alternatively, movable wooden handrail gates with protruding conventional hinges and expensive hardware may span the opening. Devices such as cables or chains do not retain the structural integrity of the boat handrail and are not safe in harsh weather conditions. Additionally, for yachting use, the overall aesthetic appearance of the handrail structure is an important issue, and current designs of hook and cable do not entirely satisfy the expected demands of boat owners for aesthetically pleasing designs.

Therefore, despite the obvious need for a safe and convenient handrail gate design, there has not heretofore been any completely satisfactory solution to the problem of providing a simple gate section in the handrail that would retain the structural integrity of the original handrail and at the same time be both aesthetically pleasing and safe.

It is apparent that the objectives of structural integrity and aesthetic appeal can be met by providing a handrail gate having the same cross-section as the stationary portion of the handrail. The problem is to provide a hinge on one end of the gate and a lock at the other end of the gate that maintain a uniform cross-section throughout the handrail when the gate is closed, even at points of connection. Such hinge and lock should be inexpensive, safe, easy to manufacture, install and use, aesthetically pleasing, durable and solid enough to resist occasional impacts accidentally caused by users without being displaced or sufficiently damaged to interfere with satisfactory operation.

SUMMARY OF THE INVENTION

An object of the present invention is to provide a combination of a hinge coupling and lock for interconnecting a standard tubular handrail (typically but not necessarily of circular cylindrical shape) with a pivoting arm to form a gate within the handrail that retains the structural integrity of the original handrail, is safe and aesthetically pleasing.

Another object of the present invention is to provide a hinge and lock mountable on or connectable to a standard tubular handrail and on or to a mating pivotable gate arm, that are easy to manufacture, install and use, and that are at the same time durable and reliable.

Another object of the present invention is to provide a hinge coupling as aforesaid that enables pivoting of the gate arm through an angle up to about 180°.

Another object of the present invention is to provide a gate lock as aforesaid that locks automatically when the gate is closed.

Preferred Embodiment of the Gate

The gate according to the invention is particularly suitable for use with an elongate handrail or the like that has one or more open gateways that need to be locked (latched) closed from time to time. Each gateway exists between two spaced aligned terminals of the handrail, one terminal on either side of the gateway.

According to a preferred embodiment, the gate includes a pivotable gate arm, preferably having the same profile in cross-section as the handrail, and pivotally movable from a closed locked (latched) position to a fully open position at which the gate arm lies next to the adjoining stationary handrail. Even though the gate arm itself may be substantially uniform along its length or at least longitudinally symmetrical, the two ends of the gate arm may conveniently be referred to as the hinge end and the lock end of the gate arm, since one end of the gate arm is fastened to a hinge coupling for hingedly connecting the hinge end of the gate arm to one terminal (conveniently referred to as the hinge terminal) of the handrail, and the other end of the gate arm is fastened to one component of a two-component lock (latch). The other lock component is fastened to the other terminal of the handrail, conveniently referred to as the lock terminal of the handrail. The two lock components matingly engage one another as the lock end of the gate arm moves into alignment with the lock terminal of the handrail.

The two lock components are respectively provided with mating components of a releasable latch that is operative to latch the gate arm to the handrail when the lock end of the gate arm is aligned with the neighbouring lock terminal of the handrail, and the mating lock components have come into engagement with one another. A release means such as a slidable trigger is provided for releasing the two lock components from one another after they have locked together.

The lengths of the gate arm and of the hinged coupling and lock elements are selected so as to provide a substantially uninterrupted continuum of the entire handrail structure (including the gate), when the gate arm is locked into alignment with the handrail. To optimize the structural continuity, the peripheral profile of the hinge coupling and of the lock elements are selected to be identical to or at least to merge with the peripheral profile of the gate arm and the handrail.

Handrails are frequently tubular with circular peripheral profiles. According to the preferred embodiment of the invention, the terminals of the handrail and the ends of the gate arm are formed as, or provided with, tubular receptacles. The hinge coupling and lock elements are provided with stubs insertable into and mating with the interiors of the tubular receptacles, preferably in a tight fit or at least a snug fit. Auxiliary tightening means are also preferably provided to fasten the hinge coupling and lock elements in place during normal use.

Preferred Embodiment of the Hinge Coupling

In accordance with the foregoing objectives, there is provided an improved hinge coupling for connecting one terminating end of a stationary handrail to a pivoting gate arm. The handrail may typically consist of hollow tubing or equivalent; the handrail can be constructed of hollow bars of any selected cross-section, although cylindrical tubing is the most common and generally the least expensive to manufacture. The gate arm preferably has the same cross-section as all other longitudinal (stationary) portions of the handrail. The hinge coupling in the closed position has a periphery matching the periphery of the handrail. It can be conveniently manufactured so as not to have any sharp nor obtrusive parts or edges, thus permitting it to constitute an integral part of the hand railing. In order to merge visually and structurally with the rest of the handrail, the hinge coupling (and also the lock to be described below) may both be fabricated out of the same material as the stationary portion of the handrail. For visual continuity, they may have the same surface finishing as the stationary portion of the handrail.

A preferred embodiment of the hinge coupling consists of two connectors, one fixed and the other mobile, and one middle (intermediate) link component located between the fixed and mobile connectors and pivotally connected to each. The adjoining terminating end of the hollow stationary handrail is open prior to installation of the hinge coupling. The fixed connector is inserted into the end of the opening in the stationary handrail, and the mobile connector is inserted into the adjoining proximal open end of the pivoting gate arm. [Note that the insertion arrangement could be reversed; the components could be designed so that the adjoining ends of the handrail and gate arm are insertable into the respective hinge connectors, but such alternative would require specialized manufacture of the terminal end of the handrail, and would be less convenient as well as probably being more expensive.]

In the preferred embodiment, each connector has two parts preferably formed integrally with one another and coaxial with one another, viz an exposed clevis portion and an insertable stub portion. The stubs of the fixed and mobile connectors may be identical to one another. The stub of each connector is formed as a short hollow tubular element having an outer diameter the same as or just slightly smaller than the inner diameter of the mating open part of the adjoining stationary handrail, so that the stub can engage the terminating portion of the stationary handrail in a snug fit or preferably a tight fit. Preferably the stub is provided with circumferentially spaced longitudinally extending slots and with bevelled or chamfered distal edges to facilitate the initial insertion of the stub into the terminal portion of the stationary handrail. (The cross-section of the mating elements need not necessarily be circular, but at least a snug fit and preferably a tight fit of the mating elements should be designed.)

When installed, the stub of the fixed connector is inserted and secured into the open end of the adjoining stationary handrail. Similarly, the stub of the mobile connector is inserted and secured into one open end of the pivotable gate arm. The exposed clevis parts of the fixed and mobile connector are aligned; each connector is pivotally attached to a respective end of the link therebetween by a respective pin that does not protrude from the surface of the hinge coupling. The fixed connector may be retained in place within the handrail simply by means of the tight fit, but is preferably more firmly attached to the stationary handrail by an auxiliary tightening device to be described below, so that the fixed connector does not in normal use move after installation. The mobile connector is similarly attached to the open end of the gate arm.

The auxiliary tightening element of each connector according to the preferred embodiment consists of a pre-bent, drilled and tapped steel brace or cross-piece situated inside the stub portion of the connector and spanning the interior diameter of the open end of the stub. An axially extending machine bolt penetrates a central hole in the web of the clevis with its head accessible from the clevis side of the web, and its shaft extending into the stub to threadedly engage a mating central threaded hole in the brace. The circumferentially spaced axially extending slots in the stub serve to form expansion joints that enable the stub walls to be forced radially outwardly into a compressive engagement with the interior wall of the mating tubular element (the gate arm or the stationary handrail, as the case may be) into which the stub has been inserted. The ends of the brace lie against an interrupted circular margin formed at the distal extremity of the inside surfaces of the connector. The margin has an inclined surface against which the ends of the brace bear when the brace is tightened into place against the stub walls. The auxiliary tightening is performed before the link is attached to the connector. When the bolt is tightened into the brace by means of a screwdriver whose working tip engages the head of the bolt from the clevis side of the clevis web, the bolt pulls the brace toward the clevis. Because the convex surface of the bent brace is outward relative to the clevis, this pulling of the brace forces its ends into a tight engagement with the margin at the distal end of the stub wall. Sliding of the brace inside the connector is prevented or at least hindered by the margin; consequently, the brace tends to straighten and in so doing, to exert pressure on the inside walls of the stub, which in turn presses against the interior walls of the hollow tubing of which the mating gate arm or stationary handrail is made, causing a tight friction fit of the stub against the tubing of the gate arm or handrail, as the case may be. The tightening provided by the auxiliary tightening device is reversible so that the connector can be removed from the handrail if need be. Because the pressure-fit arrangement of the mentioned tightening device is not an absolute latch or lock, if a force greater than normally expected forces is applied to the opened pivoting arm, the hinge connector will tend to relax and disengage from the handrail rather than break or deform.

To link the two connectors together, the link element according to the preferred embodiment is shaped overall as approximately a rectangular parallelepiped, with opposed slightly arcuate profile-defining surfaces that merge with the periphery of the handrail and the exposed surfaces of the clevis portions of the connectors. The link also is provided with some special shaping of that end of the link proximate to the one of the connectors, preferably the fixed connector as will be described, and preferably has bevelled corners for ease of motion of the interlinked components and so as to resist catching of fabric. Each clevis comprises spaced opposed clevis fingers attached to a clevis web, the fingers defining a clevis gap, with the clevis gaps of the devises being of substantially identical widths. The thickness of the link is just slightly smaller than the clevis gap of each connector so that the profile-defining surfaces of the link merge closely with the exposed surfaces of the exposed clevis portions of the connectors, forming a peripheral continuum, while permitting the link to move freely within the clevis portions of the two connectors. The link has two holes, each hole for receiving a pin for pivotally attaching the link to one of the connectors such that the link can be pivotally attached to both connectors with two pins, each pin passing through one of the connectors and the link. At least one of the holes is elongate so as to permit the link and connector attached to each other with the pin through the elongate hole to move axially as well as pivotally relative to each other, such that the hinge connector can be extended and contracted. Preferably, the link is provided with a circular hole for receiving the pin linking it to the mobile connector, and with an elongate hole or slot for receiving the pin linking it to the fixed connector, so that the fixed connector is capable of limited axial movement relative to the link, as well as pivotal movement relative to the link. It is possible to design the components so that axial displacement of the mobile connector relative to the link is resisted by a spring, but for most purposes, this is an unnecessary complication that would add to the expense of manufacture, and would add another element to the combination that would be capable of failure.

Note that the link can pivot with respect to both pins. This double-pivoting arrangement enables the pivoting gate arm to move through about a maximum 180° angle relative to the stationary handrail, thereby permitting the gate arm when fully open to rest on the adjoining portion of the handrail fully parallel thereto. The clevis web is shaped in the form of shallow concave hollow so that the link can pivot without its corners binding against the web. The corners of the link can be bevelled sufficiently to assist in avoiding binding.

The clevis of the mobile connector is very similar to the clevis of the fixed connector, but the clevis web surface of the fixed connector has a more elaborate form than that of the mobile connector, in order to mate with the associated end of the link. The preferred shaping of these mating parts permits free upward pivoting of the link relative to the fixed connector but provides a tongue-and-groove catch to prevent the link from pivoting downwardly. The tongue-and-groove catch acts to impede downward pivoting of the link over the full range of relative axial positions of the fixed connector and the link, permitted by the axial movement of the relevant pin within the elongate hole. This structural arrangement lends to the hinge a motion-limiting characteristic permitting the pivotable gate arm to pivot from the closed position to the open position only in one general direction, usually upward. Accordingly, at rest in the closed position, the gate arm will tend to remain coaxial with the stationary handrail, and will tend not to collapse or pivot downwardly even if it is not supported at its distal end.

The link is just long enough so that when the hinge coupling is closed, the distal ends of the clevis portions of both connectors touch each other so all three hinge coupling components (the two connectors and the link) when fitted together and aligned form, to the casual observer, one seemingly-solid piece.

When the gate arm is opened, the mobile connector first pivots on its pin relative to the link, enabling the gate arm to be opened up to about a right angle relative to the stationary handrail. As the mobile connector is pivoted relative to the link and the fixed connector, the top of the end of the mobile connector proximate to the fixed connector, moves in an arcuate path against the fixed connector, which acts to spread the fixed and mobile connectors. This spreading of the connectors is permitted by the ability of the fixed connector pin to move axially relative to the link, since that pin is within an elongate hole, as described previously. The ability of the hinge coupling to spread (or extend) and contract during pivoting permits the hinge coupling to have the external shape and appearance (excepting the joints between the connectors and the link) of the relevant handrail and gate when the gate is in the closed position. Further movement of the arm is enabled by pivotal motion of the link about the pin for the fixed connector, so the arm can pivot through a further right angle.

It will be clear that the connector having the pin passing through the elongate hole in the link may be the mobile connector rather than the fixed connector. However, for installations where the gate opens by pivoting upwards, it is preferable for the fixed connector to contain the pin passing through the elongate hole. In this configuration, the tongue-and-groove elements for mating with the fixed connector are essentially hidden when the gate is open, in that the end of the link having the tongue-and-groove elements is at the bottom side of the fixed connector and thus would not be seen by a casual observer; and the end of the link opposite the tongue-and-groove elements, which can be relatively smooth and therefore more appealing to the eye and less likely to catch clothing or other fabric, is facing upwards.

When the gate arm is fully opened, it rests parallel to and on top of the stationary handrail. A plastic buffer or the like can be affixed to the pivoting arm in order to protect the surfaces of the handrail components at points of contact.

The hinge coupling can be made from diverse materials, in the preferred embodiment for use on water craft, out of stainless steel or durable and aesthetic hardwood. The hinge coupling can also be made out of aluminum that can be polished and anodized to achieve a chrome appearance. The anodizing serves as a protection against oxidation, ensuring a longevity of the apparatus under harsh conditions.

Preferred Embodiment of the Gate Lock

In accordance with the present invention, there is also provided a gate lock having what will be referred to as mating passive and active components that are respectively inserted into neighbouring terminal ends of the hollow tubing of the handrail and of the pivoting arm. The "active component" is that having working parts, notably a manually operable trigger and an axially retractable tongue operable by the trigger that at rest protrudes axially beyond the adjacent end surface of the active component. The "passive component" is the mating lock component having a latch receptacle engageable by the tongue. The active component and the passive component both have an insertable stub portion and an exposed terminal. In the preferred embodiment, the stub, having an exterior diameter equal to the interior diameter of the handrail or pivotable arm, is insertable into the tubular gate arm terminal or handrail tubing, as the case may be, preferably in a snug or tight fit. In installation, the stub of one lock component, preferably the active component, is inserted into a terminal end of the gate arm, and the stub of the other lock component, preferably the passive component, into a neighbouring end of the handrail.

The insertable stub of each lock component is similar to the insertable stub of both hinge connectors described above. In the preferred embodiment, the insertable stub of the passive portion is inserted and fastened into the terminal opening in the stationary handrail, and the insertable stub of the active portion is inserted and fastened into the terminating tubular portion of the distal edge of the gate arm. (It is not necessary that the gate arm be tubular throughout its length, but it must be tubular at its proximal end to receive the stub of the mobile hinge component, and at its distal end to receive the stub of a lock component.) In the center of each lock component, there is a hole for accommodating a threaded bolt that threadedly engages a brace, as is described in the above description of the hinge coupling. While the outside diameter of each insertable stub portion is that of the inside diameter of the handrail tubing (and of the gate arm), the outside diameter of each exposed part is the same as the outside diameter of the handrail tubing (and the gate arm). Both active and passive components of the lock have profiles that match the profiles of the handrail tubing and pivoting arm. So the hinge coupling may be connected to either end of the gate arm, and the lock may be connected to either end of the gate arm. The hinge coupling and lock both provide peripheral continuity with the gate arm and the handrail.

The stub portion of each lock component is coaxial with the exposed terminal portion that mates with the counterpart terminal of the other lock component. The greater length of each terminal may conveniently be generally shaped as a semi-cylinder with a planar diametrical surface interrupted in the case of the passive component by a generally radial protrusion from the planar diametrical surface, and in the active component by a hollow or recess shaped to fit the protrusion of the passive component. The protrusion of the passive component stops short of the periphery of the lock component so that the mating semi-cylinder of the active component has an uninterrupted semicylindrical periphery. Desirably the protrusion of the passive component has inclined surfaces that define a distal end of the protrusion that is narrower than the broader base of the protrusion. The recess on the active component is of course shaped in a complementary fashion. This shaping facilitates bringing the active component into axial alignment with the passive component when the two components are brought into mating contact.

Accordingly, overall the terminals of the passive and active lock components have fully complementary mating surfaces that when in contact together, resist any relative motion of the lock components except axially or pivotally away from one another when the stubs of the two components are inserted into respective terminal ends of the gate arm and the handrail. Further, the permitted relative pivotal motion of the passive and active components is restricted to motion that separates the contacting surfaces of the passive and active components, since the contacting surfaces define the permitted limit of relative motion of the two components.

The terminal of each lock component and the stub of the same lock component are joined by a proximal short cylindrical collar (which may be desirably integral with the exposed semicylindrical protruding portion of the lock component). The mating intermitting semicylindrical portions of the terminals project axially distally away from the cylindrical collars. When the stubs of the lock components are inserted into the associated terminal ends of the gate arm and handrail respectively, and the terminals of the lock components are in contacting engagement, the overall exposed length of the interfitting passive and active components is the total of the two collars of the terminals of the two lock elements plus the length of one of the semicylindrical portions (the mating semicylindrical portion of the other lock component is axially coextensive with the one). Of course the spacing of the handrail terminal from the distal gate arm terminal should be equal, within engineering tolerance, to the overall exposed length of the interfitting lock components.

As noted, when the gate is closed, the exposed terminals of the passive and active components fit together to form a composite cylinder that has the same profile as the profile of the handrail and of the pivoting arm. Since the gate arm should swing open in an arc that lies in the vertical plane in which the gate arm and adjoining handrail lie, it follows that the planar interrupted diametrical surfaces of the terminals should be horizontal when the gate is closed. The top half of the peripheral surface of the composite cylinder is conveniently formed by the exposed part of the active lock component and the bottom half of the peripheral surface of the composite cylinder is formed by the exposed part of the passive lock component. The collars also define a part of the peripheral surface of the closed lock. The closed lock can have other forms, as long as its profile corresponds to or at least merges with the profile of the handrail tubing.

The distal end face of the terminal of the passive lock component comprises a latch or catch receptacle, formed as a hollow or recess of generally rectangular cross-section in the radial plane; the hollow may extend proximally to form an aperture in the collar. In the active component, a mating channel aligned with the passive component's latch receptacle leads through the collar of the active component and extends axially proximally to pass completely through the material of the active component. An axially retractable tongue matingly and slidingly engages the channel; to the proximal end of the tongue is fixed (integrally or otherwise) a trigger that passes through a slot formed in the stub; the slot accommodates limited axial motion of the trigger and thus of the tongue. The tongue is biased distally outwards by means of a compression spring, one end of which abuts the proximal end of the tongue (or instead but not preferably abuts the proximal end of the trigger). The other end of the spring leans against a spring rest or cap held in place at the proximal end of the channel. The spring rest is preferably removable to permit the spring to be replaced if damaged or worn.

When the lock is closed, the tongue engages the latch receptacle in the semicylindrical portion of the passive component terminal, the tongue and latch receptacle together acting as a latch or lock. To facilitate the latch action, the tongue may be provided with a bevelled distal end surface on the side opposite the side facing the interrupted diametrical surface of the active component terminal; i.e. on the same side as the trigger in the preferred embodiment. The spring biases the tongue into latching engagement with the receptacle; the trigger must be slid proximally to retract the tongue from engagement with the receptacle. Note that the tubular cavity into which the stub carrying the trigger fits must be cut away to form a suitable slot in which the trigger slides, to permit the trigger to penetrate into the cavity and to be retracted. It is generally preferred that the trigger be on the gate arm rather than on the stationary handrail, to facilitate any necessary repair or replacement and for ease of operation.

The bevelled surface of the tongue is the first surface of the active lock component likely to contact a surface of the passive component when the passive and active components are brought into engagement with one another. A smooth engagement is facilitated by shaping the protrusion of the passive component to have an inclined surface from the distal to the base portion of the protrusion that extends from a proximal limit adjacent the collar of the passive element to a distal limit in the vicinity of the distal end of the passive component terminal, along which inclined surface the tongue slides as it nears the latch receptacle. Assuming that the semicylindrical portion of the passive lock component is on the underside and that the passive component is attached to the handrail terminal, that the semicylindrical portion of the active lock component is on the upper side and that the active component is attached to the gate arm, with the trigger on the underside of the gate arm, it can be seen that when the gate arm pivots from an open position downwardly toward the closed position, and as the terminals of the two lock components approach one another, the tongue first touches the inclined surface of the protrusion of the passive component, slides down and is gradually retracted as the tongue engages the end surface of the passive component. When both portions of the lock are positioned so that the recess on the active portion faces the latch receptacle on the passive portion, the tongue jumps from its retracted position and enters the latch receptacle. Once the tongue and the latch receptacle are mated, upward motion of the pivoting arm is prevented. The engagement of the protrusion of the passive component with the recess of the active component reinforces prevention of horizontal movement of the interfitting passive and active components of the lock, thereby preventing similar such movement of the gate arm relative to the handrail.

The components of the hinge coupling and the lock may be manufactured by die-casting, moulding or other convenient method, depending on the material from which the device is fabricated. Small details such as small holes or slots may be drilled or machined if preferred.

As with the hinge connectors, each of which may be attached to either the handrail or the gate arm, the two lock components are interchangeable. The functioning of the lock is the same in all possible arrangements; the only feature that changes is the position of the trigger that opens the lock (latch). The trigger can be accessible either from the bottom or from the top side of the tubing of the handrail structure or of the gate arm. In the preferred embodiment, the trigger is positioned at the bottom side of the tubing of the gate arm.

A longitudinal series of gate arms, hinge couplings and locks can be arranged together, thereby creating the possibility of opening large handrail sections. A preferred such combination makes use of a central stanchion that is itself hinge-coupled to a bottom pedestal, permitting the entire stanchion, apart from the hinge coupling and pedestal, to be collapsed pivotally downwardly and to assume a horizontal orientation, resting on the floor. The stanchion receives two individually operable gates, themselves coupled by the hinge connections to tubular railings on either side of the stanchion, and locking to the stanchion. By opening both gates and collapsing the stanchion downwardly, it would be possible to generate a very large opening that would permit a fairly large object to pass through. With the stanchion in its normal upright position, one gate arm may be opened, leaving the other gate arm closed.

The hinge coupling can also be installed to allow for the gate arm to pivot horizontally. To this end, the orientation of the hinge and lock components should be rotated through 90°, so that the pivoting action occurs in a horizontal plane. For example, the gate arm may be provided with a slot underneath, into which a panel may be inserted and glued or otherwise fastened in place, in which case the entire gate assembly including the gate arm and attached panel would function as an integral horizontally swinging gate. Using another hinge coupling pivoting horizontally, a second (lower) gate arm provided with a slot on its top surface could receive the lower edge of the panel and could be hingedly coupled to a convenient mounting, so as to provide reinforcement for the swinging gate and two points of hinged attachment of the gate. This combination can be used to create a partial door that is more sturdy than the simple gate arm, and offers a more secure barrier than a simple gate arm per se.

The present invention provides many advantages over previously known designs. It offers a simple and ingenious solution to the problem of securing handrail openings (gates). To a great extent, it retains the structural and peripheral integrity of the original handrail, it is durable and strong, and it presents few protrusions or obstructions that can cause injuries. The preferred embodiments provide constraints that prevent or limit motion of the gate arm in undesired directions.

BRIEF DESCRIPTION OF THE DRAWINGS

FIG. 1 is a perspective view of a handrail hinge coupling according to a preferred embodiment of the present invention mounted on a standard handrail shown in a closed position.

FIG. 2 is a cross-sectional view along the line I—I in FIG. 1 of a closed handrail hinge coupling of the type illustrated in FIG. 1, shown mounted on a standard handrail.

FIG. 3A is a perspective view of the handrail hinge coupling of FIG. 2, shown in a fully opened position mounted onto one end of a standard handrail.

FIG. 3B is a perspective view of the passive component of a lock according to a preferred embodiment of the invention mounted onto the end of the handrail opposite that shown in FIG. 3A and separated from the end of the handrail shown in FIG. 3A by the width of the gate arm. Viewing FIGS. 3A and 3B together, one perceives an open gateway, the gate arm being folded over onto the handrail portion to which it is connected.

FIG. 4 is a view partly in cross-section along the line II—II in FIG. 3 of a fully opened handrail hinge coupling of the type illustrated in FIG. 2, shown mounted on a standard handrail.

FIG. 5 is a partially exploded view of the components of the handrail hinge coupling of FIG. 2.

FIGS. 6–12 illustrate in cross-section a selected one of the connector components of the hinge coupling of FIG. 2, and in elevation the link of FIG. 2 shown linked to the selected connector component, in a series of relative angular positions.

FIG. 6 is a cross-sectional view of the mobile connector and an elevation view of the link, in closed position.

FIG. 7 is a cross-sectional view of the mobile connector and an elevation view of the link, at a 45° angle to one another.

FIG. 8 is a cross-sectional view of the mobile connector and an elevation view of the link, at a 90° angle to one another.

FIG. 9 is a cross-sectional view of the fixed connector and an elevation view of the link, in contracted closed position.

FIG. 10 is a cross-sectional view of the fixed connector and an elevation view of the link, in extended closed position.

FIG. 11 is a cross-sectional view of the fixed connector and an elevation view of the link, at a 45° angle to one another.

FIG. 12 is a cross-sectional view of the fixed connector and an elevation view of the link, at a 90° angle to one another.

FIG. 13 is a perspective view from the distal end of the passive component of a preferred embodiment of a gate lock according to the invention, showing details of its exposed portion.

FIG. 14 is a perspective view from the proximal end of the passive component of the gate lock of FIG. 13, showing details of its insertable stub portion.

FIG. 15 is a partially cross-sectional view along the line III—III in FIG. 13, showing the tightening device within the stub portion of the passive component of the gate lock of FIG. 13.

FIG. 16 is a perspective view from the distal end of the active component of the same preferred embodiment of a gate lock according to the invention, showing details of its exposed portion.

FIG. 17 is a perspective view from the proximal end of the active component of the gate lock of FIG. 16, showing details of its insertable stub portion that is insertable into one open end of a pivotable gate arm.

FIG. 18 is a partially cross-sectional view along line IV—IV in FIG. 17, showing the interior structure of the active component of the gate lock of FIG. 16.

DETAILED DESCRIPTION OF THE PREFERRED EMBODIMENT

Figure 19:
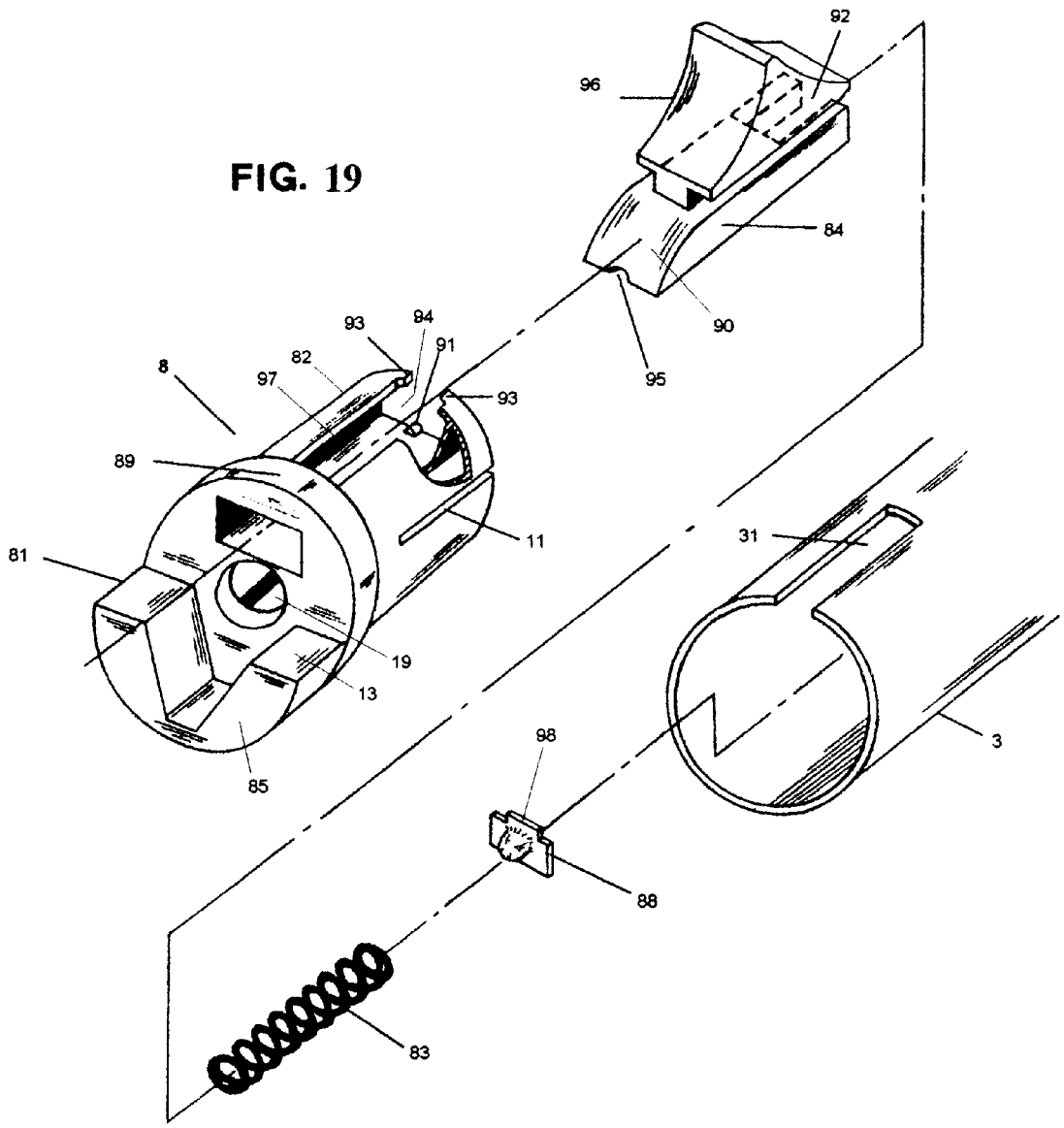
FIG. 19 is an exploded and partially cut-away view, showing the active component of the gate lock of FIG. 16.

Referring now to the drawings, there is shown in FIGS. 1–12 a preferred embodiment of a hinge coupling 1 constructed in accordance with the invention. FIG. 1 represents the hinge coupling 1 in a closed position mounted on a standard tubular stationary handrail 2. A pivoting gate arm 3 and the stationary handrail 2, having an open terminating end 21, are connected by the hinge coupling 1 consisting of a mobile connector 4, a link 5, and a fixed connector 6 held together by pins 18 and 18' as illustrated in FIG. 5. The gate arm 3 has in the preferred embodiment the same cross-section or at least the same peripheral profile as all other longitudinal (stationary) portions of the handrail 2, and the hinge coupling 1 in the closed position has a periphery matching the periphery of the handrail 2.

Each of connectors 4 and 6 has two portions preferably formed integrally with one another and coaxial with one another, viz exposed clevis portions 41 and 61 respectively, and insertable stub portions 42 and 62 respectively, as can best be seen in FIG. 5. The exposed portion 41 of the mobile connector 4 has a clevis recess or gap 45 and the exposed portion 61 of the fixed connector 6 has a clevis gap 65. The stub portion (42, 62) of each connector is formed as a short hollow tubular element having an outer diameter the same or just slightly smaller than the inner diameter of the mating open part of the adjoining stationary handrail 2 or pivotable arm 3, as the case may be. In the preferred embodiment, the insertable stub portion 42 of the mobile connector 4 is inserted and secured into one open end 23 of the adjoining stationary handrail 2 and the insertable stub portion 62 of the fixed connector 6 is inserted and secured into one open end 33 of the pivoting gate arm 3 so that both stub portions 42 and 62 can engage the terminating portions of the stationary handrail 2 and the pivoting gate arm 3 in the tight fit. The stub portions 42 and 62 of the mobile connector 4 and the fixed connector 6 may be identical to one another.

The stub portions 42 and 62 are in the preferred embodiment provided with circumferentially spaced longitudinally extending slots 11. The ends of the stub portions 42, 62 have bevelled or chamfered edges to facilitate the initial insertion of each stub portion 42, 62 into the open end 23, 33 of the stationary handrail 2 or the pivotable gate arm 3, as the case may be.

When installed, the exposed clevis portions 41 and 61 of the hinge connectors 4 and 6 are aligned and pivotally attached to a respective end of the link 5 by the pin 18 or 18'. The pins 18, 18' are sized and their ends are shaped so that they do not protrude from the curved periphery of the hinge coupling 1, so as not to catch skin or clothing, and so as to blend with the surface of the hinge coupling 1.

The link 5 is shaped overall as approximately a rectangular parallelepiped, with opposed arcuate profile-defining surfaces 53 and 54 that merge with the periphery of the stationary handrail 2 and the exposed surfaces of the clevis portions 41 and 61 of the connectors 4 and 6. The link 5 is in addition provided with special shaping of the end surface 56 that is connected to the fixed connector 6 and has bevelled corners for ease of motion of the interlinked components. The link 5 is provided with a circular hole 51 that receives the pin 18 linking it to the mobile connector 4, and an elongate hole 52 that receives the pin 18' linking it to the fixed connector 6, so that the fixed connector 6 is able to move axially (relative to the link 5) to an extended position from which it is able to pivot about the pin 18' (FIGS. 9 to 12). (Note that in the contracted position of the link 5 relative to the mobile connector 6 shown in FIG. 9, these two elements are locked together as a consequence of the shaping of their respective mating end surfaces.) The thickness of the link 5 is just slightly smaller than the clevis gaps 45 and 65 of the connectors 4 and 6 so that the profile-defining surfaces 53 and 54 of the link 5 merge closely with the exposed surfaces of the exposed clevis portions 41 and 61 of the connectors 4 and 6, forming a peripheral continuum, while permitting the link 5 to move freely within the clevis portions 41, 61 of the two connectors 4 and 6.

The arrangement of the hinge components 4, 5, 6 enables the pivotable gate arm 3 to pivot about the pin 18' attaching the mobile connector 4 to the link 5 as well as about the pin 18 attaching the fixed connector 6 to the link 5. The gate arm 3 accordingly can pivot about the pin 18 attaching the link 5 to the fixed connector 4, and can move through about a maximum 180° angle relative to the stationary handrail 2, thereby permitting the gate arm 3 when fully open to rest on the adjoining portion of the handrail 2.

Each of connectors 4 and 6 are retained in place within the handrail by an auxiliary tightening device consisting of an axially extending machine bolt 19 and a pre-bent, drilled and tapped steel brace 20 situated inside the stub portion (42, 62) of each hinge connector 4 and 6 and spanning the interior diameter of the stub (42, 62), with the convex surface of the brace 20 at the open end of the stub 42, 62 of the associated connector 4, 6. The ends of the brace 20 lie against an interrupted circular margin 10 (FIGS. 2, 5) formed at the distal end (44, 64) of the inside surface of each hinge connector 4 and 6. The bolt 19 penetrates a central hole (43, 63) in the web (48, 68) of each clevis gap 45 and 65 so the head of the axially extending machine bolt 19 is accessible from the clevis side of the web 48 and 68, and its shaft extends into the stub 62 and 42 and threadedly engages a mating central threaded hole in the brace 20.

The affixing means that serves to fasten both connectors 4, 6 inside the associated hollows or interior recesses of the stationary handrail 2 or pivoting gate arm 3 can be best seen in FIGS. 2, 4 and 5. The slots 11 in each stub portion 42 and 62 serve as expansion joints that enable the stub walls to be forced radially outwardly into a compressive engagement with the interior wall of the mating tubular element (stationary handrail 2 or pivotable gate arm 3) into which the respective stub 42 or 62 has been inserted. When the bolt 19 is tightened into the brace 20, the bolt 19 pulls the brace toward the exposed clevis portion (41 or 61). Because the convex surface of the bent brace 20 is relatively remote from the clevis (41 or 61), the pulling of the brace 20 forces the ends of the brace 20 into a tight engagement with the interrupted circular margin 10 at the distal end (44, 64) of the associated stub wall. The interrupted circular margin 10 has an inclined surface against which the ends of the brace 20 bear when the brace 20 is tightened into place. Sliding of the brace 20 inside the connector is hindered by the interrupted circular margin 10. Consequently, the brace 20 tends to straighten and exert pressure on the inside walls of the stub (42 or 62, as the case may be) that in turn press against the interior walls of the hollow tubing of which the stationary handrail 2 or at least the end portion of pivoting gate arm 3 is made. This causes a tight friction fit of the stub (42 or 62) against the tubing of the stationary handrail 2 or gate arm 3.

Each clevis 41, 61 is formed to have a generally rectangular clevis recess or gap 45, 65 within what is otherwise solid circular cylindrical material that will form the exposed peripheral surface of the fixed or mobile connector 4, 6. The recess of the clevis portion 41, 61 is located between opposed fingers 46, 47 (or 66, 67) between which the link 5 is inserted and connected. The fingers 46, 47 and 66, 67 on both connectors 4 and 6 have aligned holes that can receive the pins 18 and 18' for attaching the link 5 to the clevis portions 41 and 61. The surface 48 of the clevis web (FIG. 7) of the fixed connector 4 is shaped to form a shallow concave hollow so that the link 5 can pivot without its corners binding against the web surface 48. The corners of the link 5 can be bevelled to assist in avoiding binding.

The clevis portion 61 of the fixed connector 6 is very similar to the clevis portion 41 of the mobile connector 4, but the clevis web surface 68 (FIG. 11) of the fixed connector 6 has a more elaborate form than the web surface 48 of the mobile connector 4, in order that the fixed connector 6 can mate and interlock with the associated shaped end surface 56 of the link 5 (FIG. 2). When the link 5 and fixed connector 6 are in the extended position shown in FIG. 10, upward pivoting of the link 5 relative to the fixed connector 6 is readily possible, but a finger 57 protruding from the link end surface 56 and bearing against the underside of finger 16 (as seen in FIG. 10) protruding from clevis web 68 prevents or at least impedes accidental uncontrolled pivoting of the link 5 (in a downward direction, when installed) and accordingly prevents or impedes the attached gate arm 3 from moving pivotally downwards from a position co-axial with the stationary handrail 2. The overlapping of finger 57 with finger 16 also impedes downward pivotal movement of the link 5 in the contracted position illustrated in FIG. 9, and in positions between the extended and contracted positions. Because the link 5 can move axially relative to the fixed connector 6, merely abutting vertical surfaces (in the orientation shown in the drawings) on the clevis web of the fixed connector 6 and the relevant end of the link 5, as is sufficient to prevent further downward pivoting of the mobile connector 4 as shown in FIG. 6, would not prevent the link 5 from pivoting downward relative to the fixed connector 6. The abutting of the opposed planar surfaces of overlapping fingers 57 and 16 prevents the bottom right-hand corner (as shown in FIGS. 9 and 10) of the link 5 from moving upwards, which upwards movement, were it to occur, would permit the link 5 to sag downward to a position where the pin 18' would be in the end of the elongate hole 52 closest to the clevis web 68 and the top of the joint between the link 5 and the clevis web 68 would be opened. The impediment to downward movement in the extended position shown in FIG. 10 exists only because the length of the permitted axial movement of the mobile connector 6 relative to the link 5 between contracted and extended positions is less than the length of the overlapping portions of fingers 16 and 57, so that some overlap between the two fingers is maintained in the fully extended position.

The link 5 pivots about the pin 18' relative to the fixed connector 6, providing roughly 90° of pivoting movement by the pivotable gate arm 3 relative to the stationary handrail 2. The pivoting of the link 5 about the pin 18' is represented in FIGS. 9 to 12. FIG. 9 shows the position of the link 5 and the fixed connector 6 when the gate arm 3 is closed; the link 5 sits tightly against the fixed connector 6. As shown in FIG.

1, when the gate arm 3 is closed, the ends of the mobile and fixed connectors 4, 6 are desirably very close to each other and possibly abutting. To allow pivoting movement of the gate arm 3 in the direction up from the closed position, the mobile and fixed connectors 4, 6 have to move apart so as to have room to pivot past each other. The axial movement of the link 5 relative to the fixed connector 6, as shown in FIGS. 9 and 10, permits the mobile and fixed connectors 4, 6 to move apart as required. When the gate arm 3 is in the closed position, the abutting of the opposed vertical surfaces of the lock components 7, 8 impedes axial movement of the gate arm 3 relative to the handrail 2. During opening of the gate arm 3, the gate arm 3 becomes free to move axially relative to the handrail 2 once the opposed vertical surfaces of the lock components 7, 8 are clear of each other. Typically, the hinge coupling has sufficient play between the connectors 4, 6 and the link 5 to accommodate the slight upward movement of the gate arm 3 required to clear the vertical surfaces of the lock components 7, 8. If required, the abutting vertical surfaces of the lock components 7, 8 can be reconfigured to permit some axial movement of the gate arm 3 relative to the handrail 2 as soon as the gate arm 3 begins to pivot upwards, such as by inclining the abutting surfaces from the vertical (not shown). FIG. 11 shows link 5 pivoted upwards to about 45° relative to the fixed connector 6. FIG. 12 shows link 5 pivoted upwards to about 90° relative to the fixed connector 6. The further movement of the link 5 beyond the 90° angle is prevented by the surface 69 of the fixed connector 6 abutting the top arcuate surface 53 of the link 5. When the hinge coupling 1 is in the fully opened position, the finger 16 abuts the bottom left corner of the link 5 (as seen in FIG. 4); see also FIG. 12. This abutting supports the link 5 so as to separate the gate arm 3 and the handrail 2, and thus deters damage due to contact between the gate arm 3 and the handrail 2.

The combined pivotal movement of the gate arm 3 about both pins 18, 18' permits the gate arm 3 to pivot through two complete right angles, one 90° arc about each pin 18, 18', for a full 180° pivotal motion. FIG. 8 shows that the link 5 cannot move beyond a 90° angle about the pin 18 because of the abutting of the surface 15 of the clevis web 48 with the adjacent arcuate surface 53 of the link 5. The configuration and geometry of the abutting surfaces of the hinge components and the position of the pins 18 and 18' relative to the link 5 are selected to assist in maintaining the closed gate arm 3 aligned with the stationary handrail 2. The pin 18 for the mobile connector 4 is situated eccentrically relative to the link 5, in that the pin 18 and associated hole 51 are located closer to the tops of the mobile connector 4 and link 5 than to the bottoms of the mobile connector 4 and link 5 (as the connectors 4, 6 and link 5 are shown in FIG. 1). Consequently, the mobile connector 4 can freely move about the pin 18 in the upward sense, but is blocked from pivoting downwardly. The web 48 of the mobile connector 4 has a surface 14 abutting the end surface 55 of the link 5, which impedes the mobile connector 4 from pivoting downwardly beyond the position shown in FIG. 6.

Similarly, the eccentric position of the pin 18' for the fixed connector 6 constrains the link 5 to pivot only in the preferred direction. The hinge coupling 1 is designed to allow only free upward motion of the link 5 relative to the fixed connector 6, but provides a tongue-and-groove catch comprising the finger 57 and the finger 16 (FIG. 9) to prevent the link 5 from pivoting downwardly. Accordingly, when the hinge coupling 1 is closed, the pivoting gate arm 3 tends to remain coaxial with the stationary handrail 2 and collapse or downward pivoting is impeded even if the gate arm 3 is not supported at its lock component end.

FIGS. 13–19 represent a lock 9 having a passive component 7 and a mating active component 8 that are respectively inserted into neighbouring terminal ends of the hollow tubing of the stationary handrail 2 and of the pivoting arm 3. (Note that the orientations of the passive and active components 7, 8, and of the pivoting gate arm 3 and the handrail 2, as viewed in FIGS. 3A and 3B, 13, 16 and 19, are not mutually consistent.) FIGS. 13–15 illustrate in detail the passive component 7 of the lock 9, which in the preferred embodiment is attached to an open end of the stationary handrail 2. FIGS. 16–18 illustrate in detail the active component 8 of the lock 9, which in the preferred embodiment is attached to an end of the pivoting arm 3. The active component 8 and the passive component 7 each has an insertable stub portion 72, 82 and an exposed terminal 71, 81. Each stub 72, 82 has an external diameter equal or slightly smaller than the internal diameter of the stationary handrail 2 or pivotable arm 3. Each stub 72, 82 is insertable into mating tubing of either the gate arm 3 or the stationary handrail 2, preferably in a snug or tight fit. In the preferred embodiment, the stub 72 of passive component 7 is inserted into a terminal end of the handrail 2, and the stub 82 of the active component 8 into a neighbouring end cavity of the pivoting gate arm 3. The insertable stub 72, 82 of each lock component 7 and 8 is similar to the insertable stub 42, 62 of both hinge connectors 4 and 6 described above. In the centre of the passive component 7, there is a hole 77 and in the center of the active component 8, there is a hole 87 for accommodating an axially extending machine bolt 19 that threadedly engages a brace 20, as is described in the above description of the hinge coupling 1.

The exposed terminals 71 and 81 of the lock components 7 and 8 each further comprise a proximal short cylindrical collar 79, 89 by which they are joined to the associated stub 72, 82. The outside diameter of each collar 79 and 89 is the same as the outside diameter of the stationary handrail 2 (and that of the pivoting gate arm 3). The mating interfitting semicylindrical portions 75, 85 of the exposed terminals 71 and 81 project axially distally away from the cylindrical collars 79 and 89 and desirably are integral with the collars 79 and 89 respectively.

The proximal ends of the stubs 72 and 82 of the lock components 7 and 8 are thus each coaxially joined via the collars 79, 89 with exposed terminals 71 and 81, each mating with the counterpart terminal of the other lock component. Each exposed terminal 71, 81 is generally shaped as a semi-cylinder 75, 85 with a planar diametrical surface 12, 13 interrupted in the case of the active component 8 by a generally radial protrusion 76 from the planar diametrical surface, and in the case of the active component 8 by a hollow or recess 86, shaped to fit the protrusion 76 of the active component 8. The radial section of the protrusion 76 and of the recess 86 is generally a mating trapezoidal configuration; what is required for ease of mating engagement is a generally concave interior of the recess 86 and a mating convex protrusion 76; the trapezoidal choice is easily manufactured and serves the purpose. The protrusion 76 stops short of the periphery of the collar 79 of the passive lock component 7 so that the mating active semi-cylinder 85 has an uninterrupted semicylindrical periphery. The protrusion 76 of the active component 8 has inclined side surfaces that define a distal end of the protrusion 76 narrower than the base of the protrusion 76. The recess 86 is shaped correspondingly. The shaping of the aforementioned mating elements facilitates ease of engagement of the two lock components 7, 8 when the user wishes to lock the gate. When the stubs 72 and 82 are inserted into respective terminal ends of the gate arm 3 and the stationary handrail 2 and suitably aligned, the exposed terminals 71 and 81 of the passive and active lock components 7 and 8 have fully mating surfaces that resist any relative motion of the lock components 7, 8 when the lock 9 is closed, except axially or pivotally away from one another. Such axial motion is resisted if the hinge coupling 1 is in contracted condition (FIG. 9) when the gate is closed.

When the gate is closed, the exposed terminals 71 and 81 of the passive and active components 7, 8 fit together to form a composite cylinder that has the same profile as the profile of the handrail 2 and of the gate arm 3. The planar interrupted diametrical surfaces of the exposed terminals 71 and 81 are horizontal when the gate is closed. The top half of the peripheral surface of the composite cylinder is in the preferred embodiment formed by the exposed terminal 81 of the active lock component 8 as seen in FIG. 16, and the bottom half of the peripheral surface of the composite cylinder is formed by the exposed part 71 of the passive lock component 7 as seen in FIG. 13.

The distal end face of the exposed terminal 71 of the passive component 7 of the lock 9 further comprises a latch receptacle 74 formed as a hollow or recess of generally rectangular cross-section in the radial plane. A mating channel 94, aligned with the latch receptacle 74, is formed in the collar 89 of the active component 8 and extends axially proximally to pass completely through the active component 8, as can be seen in FIG. 19. An axially retractable tongue 84 matingly and slidingly engages the channel 94. A trigger 96 fixed to the proximal end of the tongue 84 passes through a slot 97 in the stub 82; the slot 97 accommodates limited axial motion of the trigger 96 and thus of the tongue 84. In the preferred embodiment, the trigger 96 is positioned at the bottom side of the tubing of the gate arm 3, as seen in FIG. 16 (the illustration of FIG. 19 is inverted relative to what is preferred, for convenience of illustration of the elements there illustrated).

The tongue 84 is biased distally outwards by means of a compression spring 83 abutting and preferably nesting in its proximal end 92 (or abutting the proximal end of the trigger 96). The other end of the spring 83 abuts against a spring rest or cap 88 situated at the proximal end of the channel 94 in the active component 8. The top edge of the spring rest 88 (as seen in FIG. 19) includes a projecting tongue 98 that fits into the slot 97. The spring rest 88 is held in place by the pressure of the spring 83 that pushes the spring rest 88 against a stop 91 formed at the proximal edge of the channel 94 and against tabs 93 formed as inwardly protruding extensions of the arcuate upper wall of the active lock element at the proximal end of the slot 97 in the stub 82, the tabs 93 narrowing the slot 97 at its proximal end. The distance between the top edge and the bottom edge of the spring rest 88 (as seen in FIG. 19) is selected so that when the bottom edge rests against the floor of the channel 94 and in engagement with the stop 91, the top tongue engages the tabs 93. The spring 83 may be removed for replacement if it is damaged or worn by compressing the spring 83 against the trigger 96 so as to permit removal of the spring rest 88 and the spring 83. There is an elongate groove 95 on the flat side of the tongue 84 facing the recess 86 of the active component 8 configured to clear the stop 91 when the lock 9 is assembled and the tongue 84 is inserted into the channel 94.

When the lock 9 is closed, the tongue 84 engages the latch receptacle 74 in the semicylindrical portion of the passive component terminal 71, the tongue 84 and latch receptacle 74 together acting as a lock or latch. The tongue is provided with a bevelled distal end surface 90 (FIG. 19) on the same side as the trigger 96 in the preferred embodiment. The spring 83 biases the tongue into latching engagement with the receptacle 74; the trigger 96 must be slid proximally to retract the tongue 84 from engagement with the receptacle 74. The tubular cavity (preferably the open end of the gate arm 3 into which the stub 82 carrying the trigger 96 fits, must be cut away from the pivoting gate arm 3 (in the preferred embodiment) to form a suitable slot 31 in which the trigger 96 slides, to permit the trigger 96 to penetrate into the channel 94 and to be retracted.

The bevelled surface 90 (FIG. 19) of the tongue 84 is the first surface of the active lock component 8 that contacts a surface of the passive component 7 when the passive and active components 7, 8 are brought into engagement with one another. The protrusion 76 has a longitudinally inclined surface 73, facilitating a smooth engagement of passive and active components 7 and 8. In the preferred embodiment, when the pivoting gate arm 3 is being closed, the tongue 84 first touches the longitudinally inclined surface 73, slides down and is gradually retracted. When both components of the lock 9 are positioned so that the opening of the channel 94 on the active component 8 faces the latch receptacle 74 on the passive component 7, the tongue 84, acting under the force of the spring 83, moves quickly away from its retracted position and enters the latch receptacle 74. Once the tongue 84 and the latch receptacle 74 are mated, upward motion of the pivoting arm is prevented. The engagement of the protrusion 76 of the passive component 7 with the recess 86 of the active component 8 reinforces prevention of horizontal movement of the interfitting passive and active components 7 and 8 of the lock 9, thereby preventing similar such movement of the gate arm 3 relative to the handrail 2.

The scope of the invention is not to be limited by the specific details described, but is to be given the full scope established by the appended claims. As used in the appended claims, the word "tubing" means a hollow bar of any suitable profile (e.g., circular, rectangular, oval). As used in this specification, including the claims, the word "axial" is used with reference to the longitudinal axis of the handrail and gate when in the closed position, and is used to identify relative movement of the components of the hinge coupling 1 as if those components were in the closed position.

List of Component Elements and Reference Numerals

1—hinge coupling;
2—stationary handrail;
3—pivoting gate arm;
4—mobile connector;
5—link;
6—fixed connector;
7—passive component of lock device 9;
8—active component of lock device 9;
9—lock;
10—interrupted circular margin inside each insertable stub portion;
11—circumferentially spaced longitudinally extending slots on stub portions;
12—planar diametrical surface of semi-cylinder 75;
13—planar diametrical surface of semi-cylinder 85;
14—surface of the fixed connector 4 interfering with the end surface 55 of the link 5;
15—another surface of interference between fixed connector 4 and link 5;
16—protruding finger on web 68;
18, 18'—pins connecting link 5 with connectors 4 and 6;
19—axially extending machine bolt;
20—pre-bent, drilled and tapped steel brace;

21—outer edge of stationary handrail 2 attached to hinge 1;
23—open end of stationary handrail 2;
31—slot on pivoting arm 3;
33—open end of pivoting arm 3;
41—exposed clevis portion of fixed connector 4;
42—insertable stub portion of fixed connector 4;
43—hole made in the web 48 for receiving bolt 19;
44—distal end of the stub portion 42;
45—clevis gap in exposed part 41 of fixed connector 4;
46, 47—two opposite fingers bordering clevis gap 45;
48—web of the clevis gap 45;
51—simple circular hole in link 5 for accommodating pin 18;
52—elongate hole in link 5 for accommodating pin 18';
53—top arcuate profile-defining surface of link 5;
54—bottom arcuate profile-defining surface of link 5;
55, 56—end surfaces of link 5;
57—protruding finger on end surface 56;
61—exposed clevis portion of mobile connector 6;
62—insertable stub portion of mobile connector 6;
63—hole made in the web 68 for receiving bolt 19;
64—distal end of the stub portion 62;
65—clevis gap in exposed part 61 of mobile connector 6;
66, 67—two opposite fingers bordering clevis gap 65;
68—web of the clevis gap 65;
69—surface of the mobile connector 6 interfering with the top surface 53 of the link 5;
71—exposed terminal of passive lock component 7;
72—insertable stub of passive lock component 7;
73—longitudinally inclined surface;
74—latch receptacle;
75—semicylindrical portion of the passive component;
76—radial protrusion on the passive component 7;
77—hole for accommodating machine bolt 19;
79—collar on passive component 7;
81—exposed terminal of active lock component 8;
82—insertable stub of active lock component 8;
83—compression spring;
84—axially retractable tongue;
85—semicylindrical portion of the active component;
86—recess on the active component 8;
87—hole for accommodating machine screw 19;
88—spring rest;
89—collar on active component 8;
90—bevelled surface of the tongue 84
91—stop on active component 8;
92—proximal end of the tongue 84;
93—tabs in the slot 97;
94—channel formed in the collar 89 of the active component 8;
95—groove in tongue 84;
96—trigger;
97—slot formed in the stub 82
98—tongue formed in the spring rest 88.

What is claimed is:

1. For a handrail having a peripheral profile and having an open gateway between two aligned terminals of the handrail, one terminal on either side of the gateway, a gate comprising:

a pivotable gate arm having a peripheral profile that is substantially the same as the peripheral profile of the handrail, and having a hinge end and a lock end;

a hinge coupling one end of which is fastened to the hinge end of the gate arm and the other end of which is fastened to a hinge terminal of the handrail, being one said terminal of the handrail, for hingedly connecting the hinge end of the gate arm to the hinge terminal of the handrail;

a two-component lock, one lock component of which is fastened to the lock end of the gate arm, and the other lock component of which is fastened to a lock terminal of the handrail, being the other said terminal of the handrail;

a release means for releasing the two lock components from one another after they have locked together;

the two lock components matingly engaging one another as the lock end of the gate arm moves into alignment with the lock terminal of the handrail in a closed position;

the two lock components being respectively provided with mating components of a releasable latch operative by the release means that is operative to latch the lock components together and thereby lock the gate arm to the handrail when the lock end of the gate arm is aligned with the lock terminal of the handrail and the mating lock components have come into engagement with one another;

the length of the gate arm and of the hinged coupling and lock elements being selected so as to provide a substantially uninterrupted continuum of the handrail when the gate arm is locked into alignment with the handrail;

the hinge coupling and the lock elements each having a peripheral profile selected to merge with the peripheral profile of the gate arm and the handrail.

2. A gate as defined in claim 1, wherein the terminals of the handrail and the ends of the gate arm include tubular receptacles, and wherein the hinge coupling and lock elements are provided with stubs insertable into and mating with the interior of the tubular receptacles of the gate arm and handrail for mating engagement therewith.

3. A gate as defined in claim 1, wherein the hinge coupling comprises:

a fixed connector for attaching to a terminal portion of the handrail;

a mobile connector for attaching to the hinge end of the gate arm; and a link pivotally connected to the fixed connector and the mobile connector by means of separate pivot axes, one for each connector;

the pivot axes being spaced from one another to permit the link to pivot about the fixed connector axis and the gate arm to pivot about the mobile connector axis; and the pivot connection between one of the connectors and the link having limited axial movement so that the hinge coupling can be extended and contracted so as to extend the hinge coupling to permit the fixed connector and mobile connector to pivot past each other, and to contract the hinge coupling so that the connectors and link have an external profile substantially identical to that of the handrail and gate arm.

4. A gate as defined in claim 3, wherein:

the link is pivotally connected to each connector by means of a pin passing through the connector and a hole in the link; and the hole of the pivot connection having limited axial movement is an elongate hole such that the pin may be moved within the elongate hole in directions substantially perpendicular to the longitudinal axis of the pin.

5. A gate as defined in claim 3, wherein the pivot connection having limited axial movement is between the fixed connector and the link.

6. A gate as defined in claim 3 wherein
the mobile connector and fixed connector each comprise a clevis comprising two opposed clevis fingers attached to a clevis web, the clevis fingers defining a clevis gap, the clevis gaps being of substantially identical widths;
the link is sized for insertion into the clevis gaps such that the width of the link is selected to be slightly less than the width of the clevis gap, the length of the link is selected to provide substantial peripheral continuity of the hinge coupling between the clevis webs, and exposed peripheral surfaces of the devises and exposed surfaces of the link are shaped to provide substantially uninterrupted surface continuity between the gate arm and the handrail to which the hinge coupling is connected.

7. A gate as defined in claim 6 wherein the link has two end surfaces, one end surface being adjacent to one clevis web when the gate arm is in the closed position and the other end surface being adjacent to the other clevis web when the gate arm is in the closed position, and the clevis web surfaces and the end surfaces of the link are matingly shaped to permit substantially unencumbered pivotal movement of the gate arm upwardly from the closed position through an angle of substantially 180°.

8. A gate as defined in claim 7, wherein the mobile connector abuts the link and the fixed connector abuts the link when the gate arm has pivoted through about 180° from the closed position, so as to impede further pivotal motion of the gate arm through more than about 180° from the closed position.

9. A gate as defined in claim 8, wherein:
the mobile connector abuts the link when the mobile connector has pivoted through about 90° relative to the link from the closed position; and
the fixed connector abuts the link when the link has pivoted through about 90° relative to the fixed connector from the closed position.

10. A gate as defined in claim 6, wherein the link has two end surfaces, one end surface being adjacent to one clevis web when the gate arm is in the closed position and the other end surface being adjacent to the other clevis web when the gate arm is in the closed position the clevis web surfaces of the mobile and fixed connectors, and the adjacent end surfaces of the link are provided with abutment elements that abut when the gate arm is in the closed position so as to resist downward pivotal motion of the gate arm.

11. A gate as defined in claim 10, wherein the abutment elements of the link and connector that are pivotally connected with a pivotal connection having limited axial movement, comprise, respectively:
a clevis web surface having a projecting first finger having an abutting surface substantially parallel to the longitudinal axis of the handrail and gate arm when the gate arm is in the closed position; and
a link end having a projecting second finger having an abutting surface substantially parallel to the longitudinal axis of the handrail and gate arm when the gate arm is in the closed position;
wherein the first and second fingers are configured to overlap through the full range of limited axial movement of the link relative to the relevant connector, such that some portion of their abutting surfaces abut when the gate arm is in the closed position so as to impede pivotal movement of the link and relevant connector relative to each other in the direction opposite to their relative pivotal movement during opening of the gate arm.

12. A gate as defined in claim 6, wherein the terminals of the handrail and the ends of the gate arm include tubular cavities, and wherein the hinge coupling and lock elements are provided with stubs insertable into and mating with the interior of the tubular cavities of the gate arm and handrail for mating engagement therewith; and each of the clevis webs provides centrally a seat and axial aperture for an axially extending bolt for engaging a threaded central portion of a brace generally radially extendable upon rotation of the bolt to tighten walls of the stubs of the lock components into tight engagement with the interior walls of the tubular cavities into which the stubs of the hinge coupling are inserted.

13. A gate as defined in claim 12, wherein the stubs are provided with tubular stub walls, at least snugly and preferably tightly fitting into the tubular cavities of the gate arm or handrail into which the stubs are inserted, and the brace applies generally radially directed force to the interior portions of the stub walls, thereby to force the stub walls into tight engagement with the interior walls of the tubular cavities into which the stubs are inserted.

14. A gate as defined in claim 13, wherein the generally tubular configuration of the stub walls is interrupted by circumferentially spaced generally axially extending slots for facilitating radially outward displacement of the stub walls, thereby to facilitate tightening of the stub walls into engagement with the interior walls of the tubular cavities into which the stubs are respectively inserted.

15. A gate as defined in claim 1, additionally comprising auxiliary tightening means for tightening the hinge coupling into a secure tight fit with adjoining terminal portions of the gate arm and hand rail.

16. A gate as defined in claim 1, wherein the two lock components are each provided with a tightening means for tightening the lock components into a secure tight fit with adjoining terminal portions of the gate arm and hand rail.

17. A gate as defined in claim 1, wherein one of the lock components is provided with a manually operable trigger or equivalent for releasing the latch.

18. A gate as defined in claim 1, wherein the distal ends of the lock components are provided with mating surfaces that facilitate alignment of the lock components with one another as the gate arm is pivotally moved into closed position.

19. A gate as defined in claim 18, wherein the mating distal portions of the two lock components are provided with complementary exposed peripheral surfaces that together provide substantial peripheral profile continuity with the handrail and the gate arm.

20. A gate as defined in claim 1, including a spring for biasing the latch into latching position, thereby requiring manual retraction of the latch against the force of the spring for release of the latch.

21. A gate as defined in claim 1, wherein each said lock portion is provided with a collar and a distal projecting portion mating with the distal projecting portion of the other of the two lock components, the respective exposed end portions of the distally projecting portions of the lock components being configured to mate peripherally with the collar portion of the mating connector such that the collars and distally projecting portions of the two locked components together form a substantially continuous peripheral profile.

22. A gate as defined in claim 21, wherein the latch comprises:
a retractable tongue protruding from and slidable within the collar of one of the lock components; and a tongue-receiving cavity in the other of the lock components shaped to mate with and receive the tongue of the latch, said tongue-receiving cavity being formed at the distal end of the distally projecting portion of the lock component having the tongue-receiving cavity.

23. A gate as defined in claim 22, wherein the distally projecting portion of the lock component from which the tongue protrudes is provided with a generally concave recess and the distally projecting portion of the lock component having the tongue-receiving cavity is provided with a generally convex radially extending protrusion mating with the concave recess, thereby to facilitate alignment and engagement of the lock components when they move into engagement with one another.

24. A gate as defined in claim 23, wherein the recess and the protrusion are of generally trapezoidal radial section.

25. A gate as defined in claim 23, wherein the distal surface of the protrusion is sloped from the apex to the base of the protrusion so as to constitute a sloped surface against which the tongue bears, whereby as the lock components move into engagement with one another, the sloped surface forces axial retraction of the tongue, thereby to facilitate latching of the lock components with one another.

26. A gate as defined in claim 23, wherein the recess and protrusion interrupt respective generally planar diametrical surfaces, said diametrical surfaces being substantially horizontally oriented when the gate is locked, and the diametrical surfaces of the lock component having the tongue-receiving cavity contacting the diametrical surfaces of the lock component from which the tongue protrudes when the gate is locked.

27. A gate as defined in claim 23, wherein the terminals of the handrail and the ends of the gate arm include tubular cavities, and wherein the hinge coupling and lock elements are provided with stubs insertable into and mating with the interior of the tubular cavities of the gate arm and handrail for mating engagement therewith; and the collar of each of the lock components provides centrally a seat and axial aperture for an axially extending bolt for engaging a threaded central portion of a brace extendable upon rotation of the bolt to tighten walls of the stubs of the lock components into tight engagement with the interior walls of the tubular cavities into which the stubs of the lock components are inserted.

28. A dual gate comprising two individual gates each as defined in claim 1, and additionally comprising a central stanchion between the two gates, the stanchion provided with two opposed lock components mating with the lock components of the two gate arms of the two gates, one on either side of the stanchion, and wherein the gates are hingedly connected to stationary handrail terminals each spaced by its respective gate distance from the stanchion, whereby the two gate arms when fully pivotally opened may each rest proximate to an associated portion of the stationary handrail, and wherein the stanchion comprises a pedestal and a shaft hingedly coupled to the pedestal, the shaft being normally vertical when at least one of the gates is closed and being provided in the vicinity of its upper end with the two opposed lock components.

29. For use with a gate for a tubular handrail, the handrail having a peripheral profile, a hinge coupling for connecting one terminating end of a stationary handrail to a pivoting gate arm having a peripheral profile substantially the same as the peripheral profile of the handrail, the hinge coupling comprising in combination:
  (a) a fixed connector having a stub portion and an exposed clevis portion comprising two opposed clevis fingers attached to a clevis web;
  (b) a mobile connector having a stub portion and an exposed clevis portion comprising two opposed clevis fingers attached to a clevis web; and
  (b) a link interposed between the clevis fingers of each connector and pivotally coupled to each connector by a pin passing through the relevant clevis fingers and the link
  said stub portion of the fixed connector being for attaching to the terminal ehd of said stationary handrail;
  said stub portion of the mobile connector being for attaching to the end of said pivoting gate arm; said pivoting gate arm opening and closing the access in the handrail; and
  all said components of the hinge coupling when assembled together allowing for the gate arm to pivot up to a 180° angle.

30. A hinge coupling as defined in claim 29, in the closed position having a periphery matching the periphery of the handrail and of the pivoting arm.

31. A hinge coupling as defined in claim 29, wherein the exposed clevis portions of the fixed and mobile connectors have clevis gaps of substantially identical widths formed as generally rectangular recesses; each said clevis gap being located between two fingers of the clevis between which a section of the link is interposed and attached by an associated one of said pins.

32. A hinge coupling as defined in claim 31, wherein the clevis web of the mobile connector is shaped in the form of a shallow concave hollow so that the mobile connector can pivot relative to the link without the link's corners binding against the clevis web.

33. A gate as defined in claim 29, wherein the mobile connector abuts the link and the fixed connector abuts the link when the gate arm has pivoted through about 180° from a locked position, so as to impede further pivotal motion of the gate arm through more than about 180° from the locked position.

34. A gate as defined in claim 33, wherein:
  the mobile connector abuts the link when the mobile connector has pivoted relative to the link through about 90° from the locked position; and
  the fixed connector abuts the link when the link has pivoted relative to the fixed connector through about 90° from the locked position.

35. A hinge coupling as defined in claim 29 wherein the width of the link is slightly less than the gap between the clevis fingers, the length of the link is selected to provide substantial peripheral continuity of the hinge coupling between the clevis webs, and opposed profile-defining surfaces of the link are configured to merge with the periphery of said exposed clevis portions of the connectors.

36. A hinge coupling as defined in claim 29 wherein each pin passing through the link, passes through one of two holes in the link; and one of the holes in the link is an elongate hole such that the pin passing through the elongate hole may be moved within the elongate hole in directions substantially perpendicular to the longitudinal axis of the pin, such that the relevant connector is capable of limited axial movement as well as pivotal movement relative to the link, so that the hinge coupling can be extended and contracted so as to extend the hinge coupling to permit the fixed connector and mobile connector to pivot past each other, and to contract the hinge coupling so that the connectors and link have an external profile substantially identical to that of the handrail and gate arm when in the closed position.

37. A gate as defined in claim 36, wherein the pin passing through the elongate hole also passes through the fixed connector such that the link has limited axial movement relative to the fixed connector.

38. A hinge coupling as defined in claim 29, wherein the stub portions of the hinge connectors are configured for insertion into the terminal ends of the gate arm and handrail.

39. A hinge coupling as defined in claim 38, wherein the stub portions of both hinge connectors additionally comprise auxiliary means for tightening the hinge coupling into a secure tight fit within the adjoining terminal ends of the gate arm and stationary handrail.

40. A hinge coupling as defined in claim 39, wherein each of the clevis webs provides centrally a seat and axial aperture for an axially extending bolt for engaging a threaded rotation of the bolt to tighten walls of the stubs of the lock components into tight engagement with the terminal ends of the gate arm and stationary handrail.

41. A hinge coupling as defined in claim 40, wherein the stub portion of each hinge connector is formed as a short hollow element having tubular walls with an outer diameter same or just slightly smaller than the inner diameter of the mating open part of the terminal end of the handrail or the gate arm into which the stubs are inserted, and a brace that applies generally radially directed force to the interior portions of the stub walls, thereby to force the stub walls into tight engagement with the interior of the terminal ends.

42. A hinge coupling as defined in claim 41, wherein the tubular walls of each hinge connector have circumferentially spaced generally axially extending slots for facilitating radially outward displacement of the stub walls, so that the stub can engage the terminating end of the stationary handrail and the end of the gate arm in a tight fit.

43. For use with a gate for a tubular handrail, the handrail having a peripheral profile, a two-component lock for temporarily connecting one terminating end of a stationary handrail to a pivoting gate arm having a peripheral profile substantially the same as the peripheral profile of the handrail, the lock comprising in combination:

(a) an active component having a stub portion and an exposed terminal;

(b) a passive component having a stub portion and an exposed terminal;

(c) a release means for releasing the two lock components from one another after they have locked together;

one lock component being fastened to one end of the gate arm and the other lock component being fastened to one terminal of the handrail;

the exposed terminals suitably including a proximal short solid cylindrical collar the two lock components being respectively provided with mating components of a releasable latch operative by the release means that is operative to latch the lock components together and thereby lock the gate arm to the handrail when the lock end of the gate arm is aligned with the terminating end of the handrail to which a lock component is fastened and the lock components have come into engagement with one another;

the stub portion of the active component accommodating an axially retractable tongue protruding from and slidable within the collar of the active component;

the exposed terminal of the passive component having a recess or cavity shaped to mate with and receive the tongue, said recess being formed in the collar of said passive component.

44. The lock as defined in claim 43, wherein two lock components matingly engage one another in a closed position when the lock end of the gate arms moves into alignment with the lock terminal of the handrail, the lock components having a peripheral profile selected to merge with the peripheral profile of the gate arm and the handrail.

45. The lock as defined in claim 43, wherein the tongue axially retracts as the lock components come into engagement with one another and said axially retractable tongue is provided with a bevelled distal end surface to facilitate the axial retraction of the tongue.

46. A lock as defined in claim 45, wherein the recess and protrusion interrupt respective generally planar diametrical surfaces, said diametrical surfaces being substantially horizontally oriented when the gate is locked, and the diametrical surfaces of the passive component contacting the diametrical surfaces of the active component when the gate is locked.

47. A lock as defined in claim 43, wherein the active lock component is provided with a manually operable trigger or equivalent for releasing the latch.

48. A lock as defined in claim 47, wherein the stub fits into a cavity at the end of the tubular handrail or gate and the tubular cavity into which the stub carrying the trigger fits is cut away to form a suitable slot in which the trigger slides, to permit the trigger to penetrate into the cavity and to be retracted.

49. A lock as defined in claim 43, wherein the distal ends of the lock components are provided with mating surfaces that facilitate alignment of the lock components with one another as the gate arm connected to one lock component is pivotally moved into closed position.

50. A lock as defined in claim 49, wherein the mating distal portions of the two lock components are provided with complementary exposed peripheral surfaces that together provide substantial peripheral profile continuity with the handrail and the gate arm.

51. A lock as defined in claim 43, further comprising a spring for biasing said axially retractable tongue di ally outwards into latching position, thereby requiring manual retraction of the tongue against the force of the spring for release of the latch.

52. A lock as defined in claim 43, wherein each said lock portion is provided with a distal semi-cylindrical portion having a planar diametrical surface, said semi-cylindrical portion projecting axially distally away from the cylindrical collar and mating with the distal projecting portion of the other of the two lock components, the respective exposed end portions of the distally projecting portions of the lock components being configured to mate peripherally with the collar portion of the mating connector such that the collars and distally projecting portions of the two locked components together form a substantially continuous peripheral profile.

53. A lock as defined in claim 52, wherein the distally projecting portion of the active lock component is provided with a generally concave recess and the distally projecting portion of the passive lock component is provided with a generally convex radially extending protrusion mating with the concave recess, thereby to facilitate alignment and engagement of the lock components when they move into engagement with one another.

54. A lock as defined in claim 53, wherein the recess and the protrusion are of generally trapezoidal radial section.

55. A lock as defined in claim 54, wherein the distal surface of the protrusion is sloped from the apex to base of the protrusion so as to constitute a sloped surface against which the tongue bears, whereby as the lock components move into engagement with one another, the sloped surface forces axial retraction of the tongue, thereby to facilitate latching of the lock components with one another.

56. A lock as defined in claim 43, wherein the stub portions of both lock components additionally comprise auxiliary means for tightening the lock components into a secure tight fit with adjoining terminal portions of the gate arm and stationary hand rail.

57. A lock as defined in claim 56, wherein the collar of each of the lock components provides centrally a seat and an axial aperture for an axially extending bolt for engaging a threaded central portion of a brace extendable upon rotation of the bolt to tighten walls of the stubs of the lock components into tight engagement with the interior walls of the tubular cavities into which the stubs of the lock components are inserted.

58. A lock as defined in claim 57, wherein the affixing stub portion of each lock component is formed as a short hollow element having tubular walls with an outer diameter same or just slightly smaller than the inner diameter of the mating open part of the adjoining tubular cavity of the handrail or the gate arm into which the stubs are inserted, and the brace applies generally radially directed force to the interior portions of the stub walls, thereby to force the stub walls into tight engagement with the interior walls of the tubular cavities.

59. A lock as defined in claim 58, wherein the tubular walls of each lock component have circumferentially-spaced generally-axially-extending slots for facilitating radially outward displacement of the stub walls, so that the stub can engage the terminating portion of the stationary handrail and of the gate arm in a tight fit.

* * * * *